United States Patent [19]
Elias et al.

[11] 3,884,501
[45] May 20, 1975

[54] FOOT-OPERATED JUVENILE VEHICLE

[75] Inventors: Jack J. Elias; Joseph C. Tieri, both of Minneapolis, Minn.

[73] Assignee: Leisure Dynamics, Inc., Minneapolis, Minn.

[22] Filed: Jan. 23, 1974

[21] Appl. No.: 435,710

[52] U.S. Cl. ............... 280/251; 280/251; 280/243
[51] Int. Cl. ............................................. B62m 1/04
[58] Field of Search ..................... 280/251, 243, 246

[56] References Cited
UNITED STATES PATENTS

| | | | |
|---|---|---|---|
| 1,276,587 | 8/1918 | Spaulding | 280/251 |
| 1,313,134 | 8/1919 | Stocks | 280/251 |
| 1,397,068 | 11/1921 | Allen | 280/251 X |
| 2,049,345 | 7/1936 | Young | 280/243 X |

Primary Examiner—Kenneth H. Betts
Attorney, Agent, or Firm—Schroeder, Siegfried, Ryan & Vidas

[57] ABSTRACT

Disclosed is a vehicle driven by a pair of pivoted levers operated by foot pedals and swingable forwardly and rearwardly and each connected by a driving cable to a drum rotatably mounted on a wheel-carrying rear axle, each drum being in turn drivably connected by a gear type ratchet to a rear wheel and resiliently urged in a direction to cause the cable to rewind therearound and thereby retract the associated foot pedal, upon its release, to its rearwardmost position for subsequent driving action upon the rear wheel.

4 Claims, 5 Drawing Figures

FOOT-OPERATED JUVENILE VEHICLE

This invention relates to a foot-operated vehicle. More particularly, it relates to a vehicle designed to be operated by a juvenile through the use of his feet.

The general object of our invention is to provide a novel and improved juvenile vehicle of simple and relative inexpensive construction.

A more specific object is to provide a novel and improved juvenile vehicle of simple and relatively inexpensive construction which can be operated at safe and moderate speeds while creating an illusion of high speeds.

A further object is to provide a juvenile vehicle of the type designed to be operated by the feet of the rider and having simple, durable, and relatively inexpensive drive means which will move the vehicle at speeds which are moderate and safe and yet relatively high as compared to most foot-operated vehicles heretofore known.

Another object is to provide a foot-operated juvenile vehicle having novel, improved, and yet relatively inexpensive drive means associated therewith.

These and other objects and advantages of the invention will more fully appear from the following description, made in connection with the accompanying drawings, wherein like reference characters refer to the same or similar parts throughout the several views, and in which.

Figure 1:
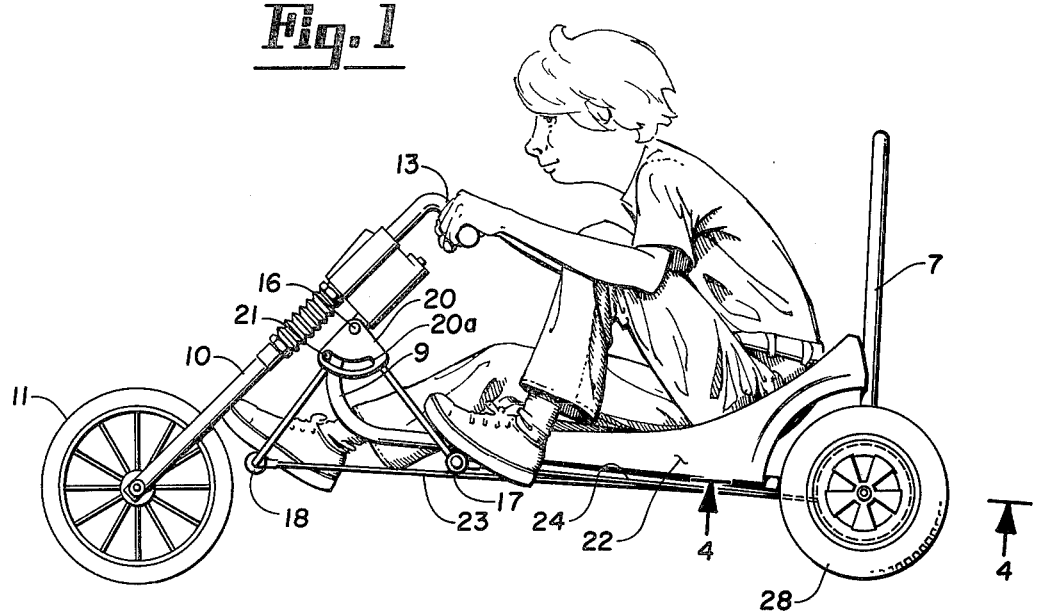
FIG. 1 is a side elevational view of one embodiment of our invention.
Figure 2:
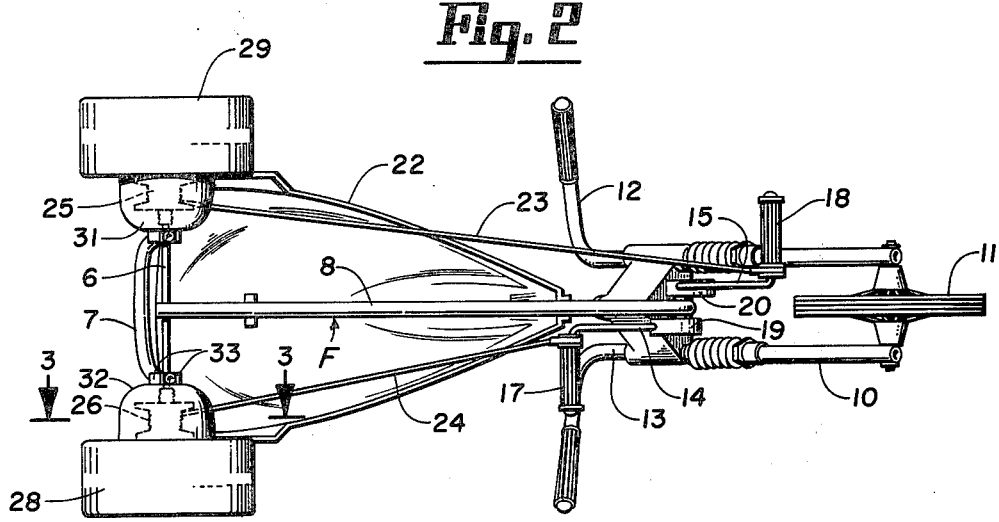
FIG. 2 is a bottom plan view of the same.

One embodiment of our invention as shown in FIGS. 1–5 is comprised of a frame F which includes an axle 6 which carries and is fixedly connected to an upstanding yoke member 7. Fixedly connected to the middle of the axle 6 and extending forwardly therefrom is a generally horizontally extending reach 8 which has an upwardly and forwardly extending front end portion 9. As best shown in FIG. 1, this upwardly extending front end portion of the reach 8 rotatably supports a forwardly disposed yoke 10 for rotation about the axis of the front end portion 9. The yoke 10 in turn rotatably supports the front wheel 11 and carries a pair of handle bars 12 and 13 by means of which the vehicle is steered.

Pivotally mounted upon the front end portion 9 of the reach 8 directly below the point at which the forward yoke 10 is mounted thereupon, is a pair of levers 14, 15, one on each side of the reach 8. A pivot shaft 16 which extends through the end portion 9 supports these two levers and each of them in turn supports one of a pair of foot pedals 17, 18 respectively. Fixedly secured to each of the foot levers 14, 15 at the pivot shaft 16 and pivoting therewith is one of a pair of keepers 19 and 20, the construction of which is best shown in FIG. 1. Each of these keepers is provided with a keeper slot, such as 20a, which cooperates with a keeper pin 21 which also extends through the forward end portion 9 and into the slot of the keepers at each side thereof so as to restrict the extent of rearward movement of its associated foot lever and pedal.

A seat member 22 is mounted upon the reach 8 directly ahead of the yoke 7 and rearwardly of the arc of movement of the foot levers 14, 15 and their foot pedals 17, 18 in such relation that a rider may sit upon the seat and by extending his legs may force the foot pedal and associated foot lever forwardly from the position shown in FIG. 1 of the rider's foot to the position shown in the same figure of the rider's right foot. Thus, as shown in FIG. 1, the foot levers are free to swing rearwardly to the position shown with the lever carrying the rider's left foot in FIG. 1 to a forward position as shown in FIG. 1 in association with the rider's right foot. The keeper pin 21 limits the extent of each of these movements.

Connected to each of the foot levers 14, 15 at their lower ends adjacent the associated foot pedals is one of a pair of flexible cables 23, 24. Each of these cables extends rearwardly from its associated foot lever and is connected at its rear end to one of a pair of drums 25, 26. Each of these drums is rotatably mounted upon the rear axle 6 and is drivably connected by a stub shaft, such as 27, to one of a pair of rear wheels 28, 29. The stub shaft can best be seen in FIG. 4. The stub shaft 27 is free to rotate relative to its associated drum, except for the existence of a ratchet mechanism to be hereinafter described.

Figure 4:
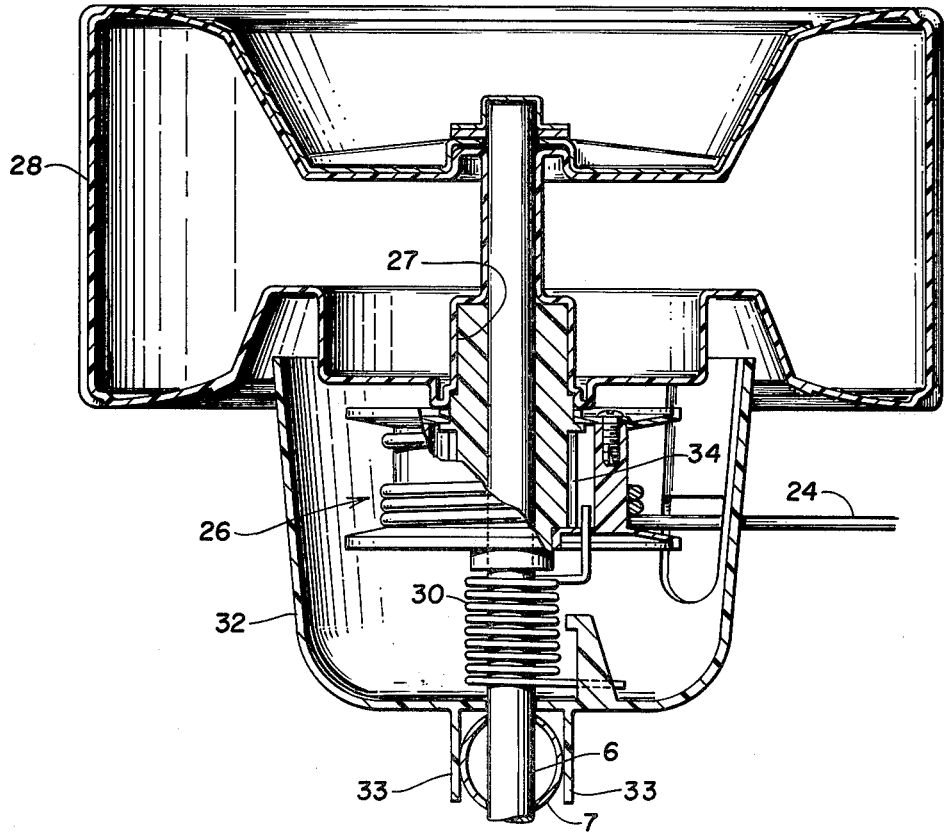
FIG. 4 is a horizontal sectional view taken through one of the rear wheels and driving drum along line 4—4 of FIG. 1.

Mounted upon the axle 6 in encircling relation thereto and in association with each drum is a spring, such as shown in FIG. 4, and identified by the numeral 30. This spring, as shown, is connected at one of its ends to its associated drum 25 or 26 and at its opposite end, to an associated housing 31 or 32, as the case may be. Each of the housings, such as housing 32, which is shown in FIG. 4, is secured to one leg of the yoke member 7 by a U-shaped keeper which is carried on the inner end of the housing and receives the lower end of one leg of the yoke therein so as to prevent rotation of the housing. The keeper has been identified with the numeral 33, in FIG. 4.

Figure 3:
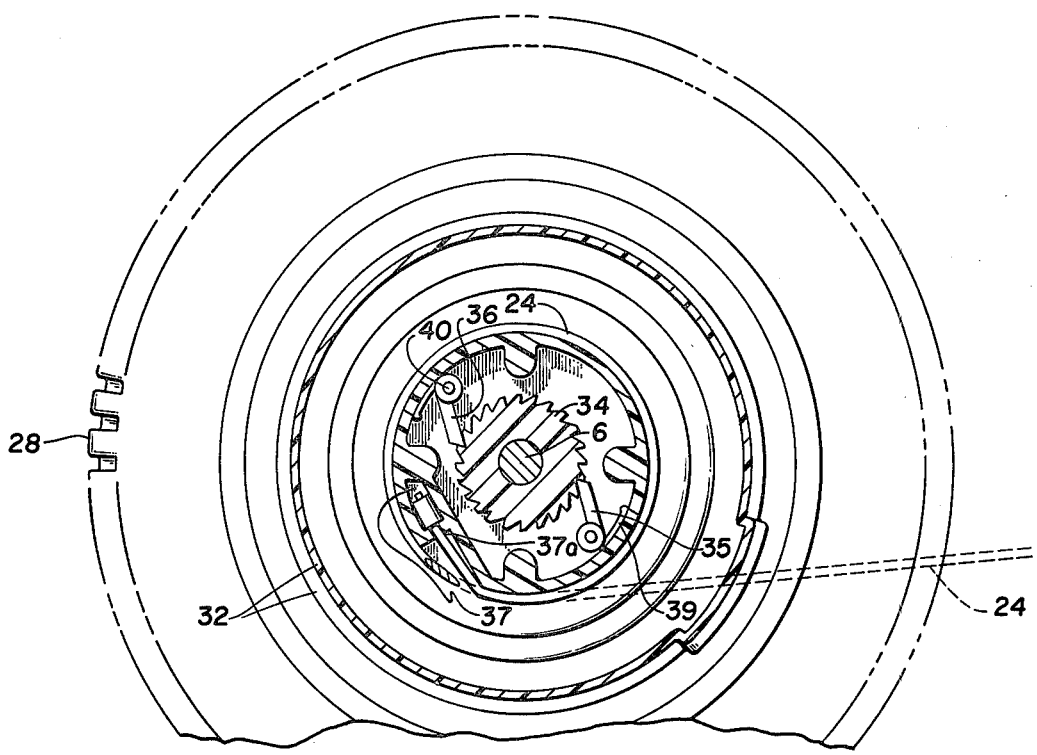
FIG. 3 is a vertical sectional view taken through one of the driving drums along line 3—3 of FIG. 2.

Each of the drums 25, 26 is drivably connected with its associated rear wheel by a ratchet mechanism which includes a gear member, such as 34, which is carried by the inner end of the stub shaft 27. Which, as previously indicated, is fixedly connected in driving relation to its associated wheel by means of its hexagonal shape which is received in a correspondingly shaped recess in its associated wheel. The ratchet mechanism also includes a pair of pawls 35, 36, each of which is pivotally mounted, as best shown in FIG. 3, on the inside surface of the inner end wall of its associated drum, each of which extends inwardly to engage the teeth of the gear member 34, as clearly shown in FIG. 3. Thus, when the drum which carries the pawls is rotated in one direction, these pawls 35 and 36 each engage the gear member 34, and rotatably drive its associated rear wheel to the extent to which the drum is forced to turn by movement of the cable associated therewith to an extended position. Upon release of the associated lever and cable, the drum is returned to its original position by its associated spring 30, and the associated cable is rewound around the exterior surface of the drum. The associated rear wheel, however, will continue to rotate with the pawls 35 sliding over the gear teeth of the gear 30 to create a high whining sound which gives an illusion of high speed to the rider.

It will be noted by reference to FIG. 3 that each of the cables is connected to its associated drum by means of a recess 37 formed in the wall thereof, and a slot 37a designed to accommodate the cable so that the enlarged end thereof may be trapped within the recess 37 to provide the necessary driving connection.

Figure 5:
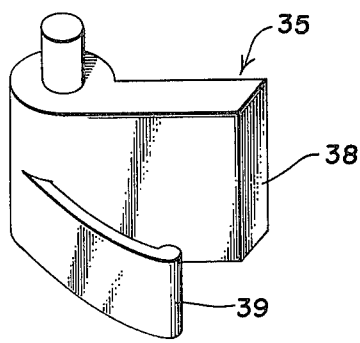
FIG. 5 is a perspective view on an enlarged scale of one of the pawls utilized in the ratchet mechanism of the driving drum.

FIG. 5 shows the details of the pawls 35 and 36. Each of these pawls is of one-piece plastic construction and includes a driving tooth 38, and a relatively thin spring arm element 39 which, as shown in FIG. 3, bears against the inner surface of its associated drum and causes the tooth member 38 to be constantly urged against the teeth of the gear 34 to ensure a driving connection between the drum and its associated rear wheels. Each of the pawls is pivotally mounted on a post member 40 which is best shown in FIG. 3 and is carried by one of the end walls of the drum.

From the above, it will be readily seen that when the rider pushes one of the foot pedals and its associated lever forwardly, the associated cable is drawn forwardly to an extended position, thereby causing its associated drum to be rotated and to drive the rear wheel associated therewith forwardly at a relatively high speed. When the forwardmost extent of movement of the foot lever has been reached and the keeper pin 21 reaches the rearwardmost extent of the keeper slot 20a, the rider relieves the pressure against the foot pedal and permits the spring 30 to cause the associated drum to retract the cable and rewind it upon its exterior surface as shown in FIG. 4. As this is done, the rear wheel continues to rotate, thereby creating the illusion of great speed which most juveniles enjoy. Meanwhile, the other foot pedal can be forced forwardly to drive the vehicle at a still higher speed as a result of extension of the opposite cable and driving of the opposite rear wheel to even higher speeds. As a consequence, even though the vehicle is not powered by an electric or combustion motor, relatively high, moderate speeds can be obtained by the rider which are, nevertheless, safe and which, upon coasting, create an illusion of high speed which is very satisfying to the rider.

It will, of course, be understood that various changes may be made in the form, details, arrangement and proportions of the parts without departing from the scope of the invention which consists of the matter shown and described herein and set forth in the appended claims.

What is claimed is:

1. A foot-operated vehicle comprising:
   a. a wheeled frame,
   b. seat means carried by said frame,
   c. a pair of rear wheels each rotatably mounted on said frame,
   d. a pair of foot levers each pivotally mounted adjacent one of its ends upon said frame ahead of said seat means and constructed and arranged to be moved by the feet of a rider sitting upon said seat means from a rearward to a more forwardly extending position,
   e. a pair of foot pedals each carried by the opposite end of one of said levers to facilitate such movement of said foot levers by such a rider,
   f. a pair of rotary gear means each connected with one of said rear wheels in driving relation and mounted for rotation therewith upon said frame,
   g. a pair of rotary drum means each associated with the gear means of one of said rear wheels and mounted for rotation upon said frame,
   h. ratchet means extending in driving relation between each of said drum means and its associated rotary gear means,
   i. cable means extending between each of said drum means and one of said foot levers and constructed and arranged to be moved with respect to its associated drum means between extended and retracted drum-encircling relation,
   j. resilient means connected to each of said rotary drum means and constantly urging the same to rotate and draw its associated cable means to retracted drum-encircling relation and its associated foot lever to its rearwardmost position,
   k. said ratchet means including a plurality of pawls pivotally mounted upon and within said drum means in position to engage said gear means and prevent rotation thereof in more than one direction, and
   l. said pawls being of single-piece construction and including a spring arm extending outwardly therefrom and engaging against an interior surface of said drum means to hold said pawl in gear-engaging relation.

2. A foot-operated vehicle comprising:
   a. a wheeled frame,
   b. a rear axle fixedly mounted on said frame,
   c. seat means carried by said frame,
   d. a pair of rear wheels each rotatably mounted on said axle,
   e. a pair of foot levers each pivotally mounted adjacent one of its ends upon said frame ahead of said seat means and constructed and arranged to be moved by the feet of a rider sitting upon said seat means from a rearward to a more forwardly extending position,
   f. a pair of foot pedals each carried by the opposite end of one of said levers to facilitate such movement of said foot levers by such a rider,
   g. a pair of rotary gear means each mounted upon one of said rear wheels in driving relation and for rotation therewith upon said axle,
   h. a pair of rotary drum means each associated with the gear means of one of said rear wheels and mounted for rotation upon said axle,
   i. ratchet means pivotally mounted upon each of said drum means and extending in driving relation between it and its associated rotary gear means,
   j. cable means extending between each of said drum means and one of said foot levers and constructed and arranged to be moved with respect to its associated drum means between extended and retracted drum-encircling condition, and
   j. resilient means connected to each of said rotary drum means and constantly urging the same to rotate and draw its associated cable means to retracted drum-encircling relation and its associated foot lever to its rearwardmost position.

3. The structure defined in claim 2 wherein each of said gear means is mounted within its associated drum means.

4. The structure defined in claim 2 wherein each of said gear means and its associated ratchet means is mounted within their associated drum means.

* * * * *